(12) United States Patent
Oh-e et al.

(10) Patent No.: US 6,392,732 B1
(45) Date of Patent: May 21, 2002

(54) ACTIVE MATRIX TYPE LIQUID CRYSTAL DISPLAY APPARATUS

(75) Inventors: Masahito Oh-e, Mobara; Sukekazu Aratani, Hitachi; Shigeru Matsuyama; Hiroaki Asuma, both of Mobara; Kiyoshige Kinugawa, Chousei-gun, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/620,245

(22) Filed: Jul. 20, 2000

Related U.S. Application Data

(63) Continuation of application No. 09/139,117, filed on Aug. 24, 1998, now Pat. No. 6,100,956, which is a continuation of application No. 08/731,162, filed on Oct. 10, 1996, now Pat. No. 5,805,247.

(30) Foreign Application Priority Data

Oct. 26, 1995 (JP) ............................................. 7-278644

(51) Int. Cl.[7] .......................................... G02F 1/1343
(52) U.S. Cl. ......................... 349/141; 349/111; 349/28; 349/34
(58) Field of Search .............................. 349/111, 28, 34

(56) References Cited

U.S. PATENT DOCUMENTS

| | | | |
|---|---|---|---|
| 4,345,249 A | 8/1982 | Togashi | |
| 4,538,884 A | * 9/1985 | Masaki | 349/28 |
| 4,568,149 A | * 2/1986 | Sugata et al. | 349/111 |
| 5,248,576 A | 9/1993 | Yokoyama et al. | |
| 5,353,135 A | * 10/1994 | Edwards | 349/34 |
| 5,392,145 A | 2/1995 | Edwards et al. | |
| 5,598,285 A | 1/1997 | Kondo et al. | |
| 5,781,261 A | 7/1998 | Ohta et al. | |
| 5,831,701 A | 11/1998 | Matsuyama et al. | |
| 5,870,160 A | 2/1999 | Yanagawa et al. | |

\* cited by examiner

*Primary Examiner*—Kenneth Parker
*Assistant Examiner*—David Chung
(74) *Attorney, Agent, or Firm*—Antonelli, Terry, Stout & Kraus, LLP

(57) ABSTRACT

An active matrix type liquid crystal display apparatus, including a pair of substrates and a liquid crystal layer interposed between said pair of substrates. One of the pair of substrates has plural scanning electrodes and plural signal electrodes arranged to cross the plural scanning electrodes. Pixels are formed at regions surrounded by the scanning electrodes and the signal electrodes. Respective ones of the pixels include an active element arranged at a vicinity of the crossing point of the scanning electrode and the signal electrode, a pixel electrode connected to the active element and a common electrode arranged in correspondence to the pixel electrode. Further, there is provided a colored filter and a shielding layer having a specific resistivity of less than $10^8$ $\Omega \cdot cm$.

1 Claim, 9 Drawing Sheets

FIG.5 FIG. 5(B)
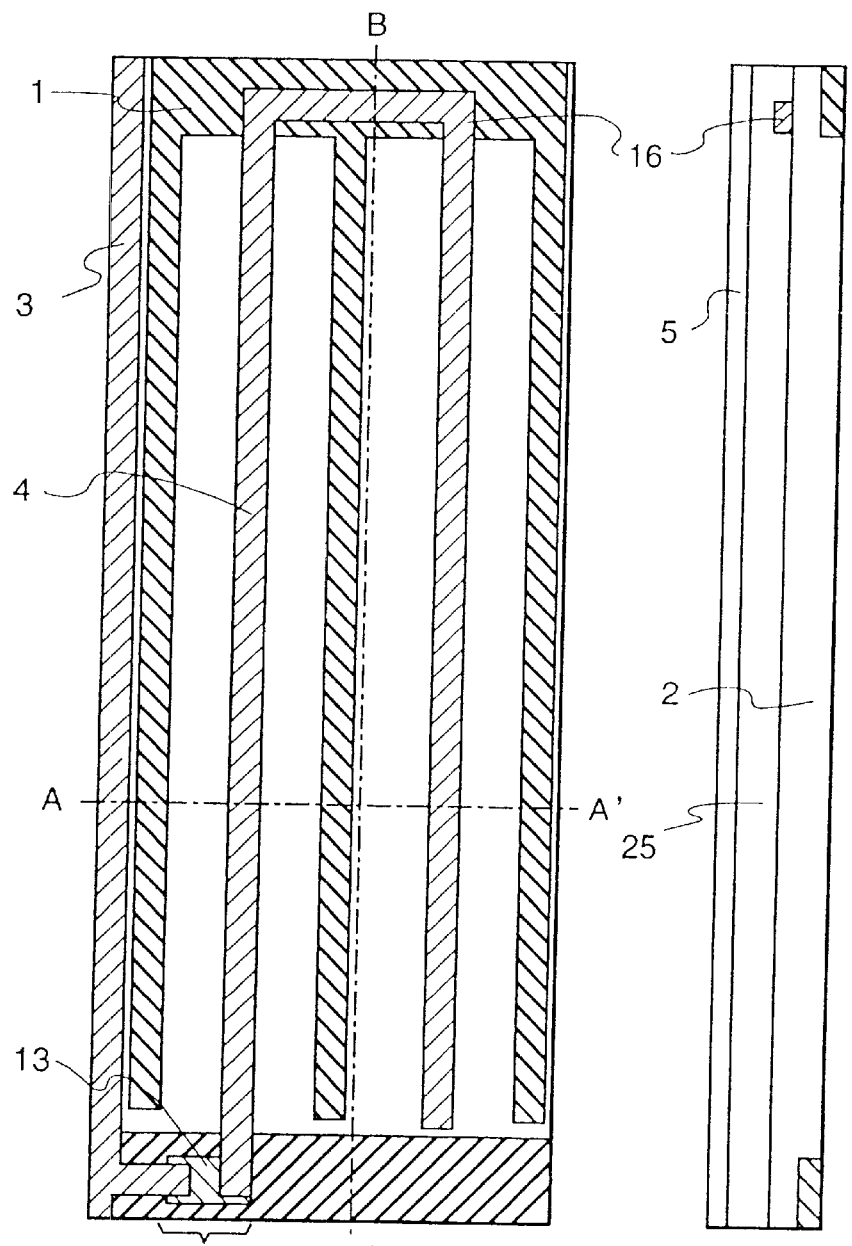
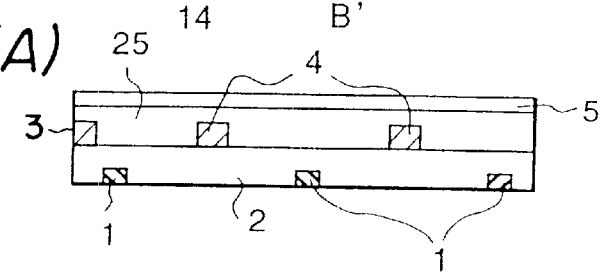
FIG.5(A)

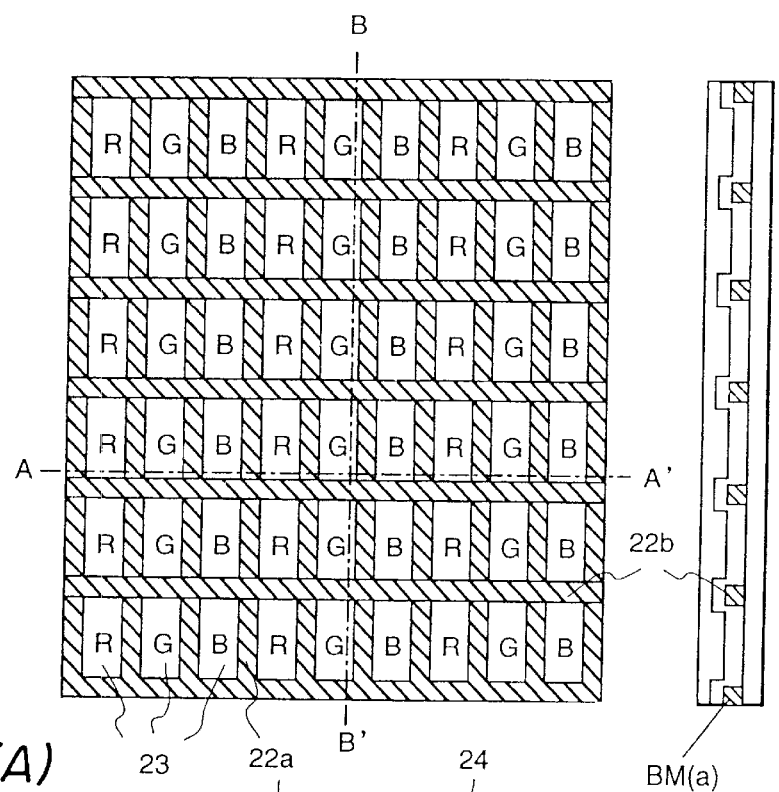
FIG. 7  FIG. 7(B)
FIG. 7(A)
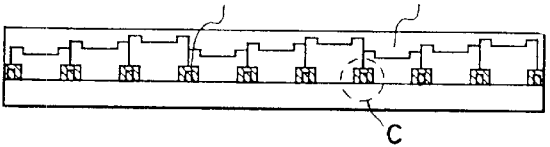
FIG. 7(C)

FIG.8    FIG. 8(B)
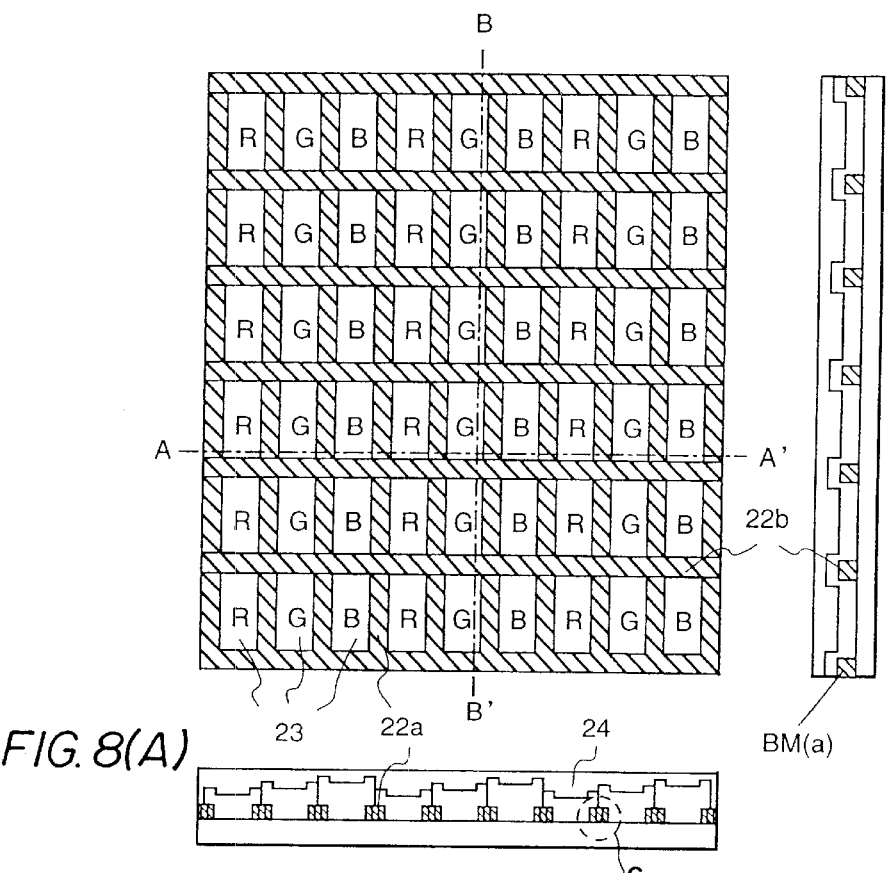
FIG. 8(A)
FIG. 8(C)
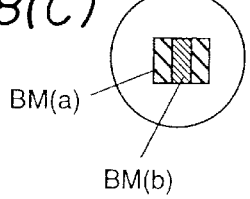

ACTIVE MATRIX TYPE LIQUID CRYSTAL DISPLAY APPARATUS

CROSS REFERENCE TO RELATED APPLICATION

This is a continuation of U.S. application Ser. No. 09/139,117, filed Aug. 24, 1998, now U.S. Pat. No. 6,100,956, which is a continuation of U.S. application Ser. No. 08/731,162, filed Oct. 10, 1996, now U.S. Pat. No. 5,805,247, the subject matter of which is incorporated by reference herein.

BACKGROUND OF THE INVENTION

The present invention relates to a liquid crystal display apparatus, wherein an electric field is supplied in a direction parallel to the surface of the substrate, and more particularly to an active matrix type liquid crystal display apparatus which provides a wide viewing angle compatible with a high image quality.

In a conventional liquid crystal display apparatus, an electrode for driving a liquid crystal is formed on the surface of each of two substrates, respectively, so that the electrodes are facing each other across the liquid crystal. The above conventional liquid crystal display apparatus uses a method which is represented by a twisted nematic display mode, wherein the liquid crystal is driven by supplying an electric field in a vertical direction with respect to the two substrates. In such case, transparent electrodes, such as ITO (Indium Tin Oxide), are used.

On the other hand, another mode of operation, wherein the liquid crystal is driven by supplying an electric field in a direction approximately parallel to the substrate using comb shaped electrodes provided on one substrate, is disclosed in JP-B-63-21907 (1988), and U.S. Pat. No. 4,345,249. In this case, the electrodes need not necessarily be transparent, and opaque metallic electrodes having a high electric conductivity can be used.

However, in the display mode wherein the electric field is supplied to the liquid crystal in a direction approximately parallel to the substrate using active elements (hereinafter called an in-plane switching mode), any method to supply an adequate electric field to the liquid crystal without causing interference between the electric fields supplied in a direction parallel to the substrate in a condition where a large amount of wiring exists, and any means to concurrently improve the image quality, have not been disclosed entirely.

Generally speaking, in the in-plane switching mode, the electric fields interfere with each other, because a large amount of wiring is formed on only one of the substrates through which electric signals are transmitted. Accordingly, the electric field supplied to the liquid crystal is influenced by unnecessary electric fields, and so an adequate electric field can not be supplied to the liquid crystal.

Furthermore, an unnecessary electric capacitance is formed between the electrodes, which sometimes causes the voltage supplied to the liquid crystal to fluctuate. The above described phenomena will cause deterioration of the image quality of the liquid crystal display apparatus. Especially, an electric field generated by an image signal electrode for transmitting signals to respective pixels having an active element, such as a TFT and the like, influences the electric field between a pixel electrode for operating the liquid crystal and the common electrode.

The potential of the image signal electrode varies always during the frame period in the course of transmitting signals. It has been known that, if the pixel electrode (its potential is in a floating condition when the active element is in an off condition) is located close to the image signal electrode, a nonuniformity appearing like shadow stripes referred to as a smear, similar to a cross talking phenomenon, is generated in parallel with the image signal electrode depending on the varying potential of the image signal electrode. In order to suppress this phenomenon, a technique to arrange the common electrode, which is always supplied with a potential from an external source, as the closest electrode to the image signal electrode has been developed by the present inventor (U.S. patent application Ser. No. 08/374,531).

However, in accordance with the above technique, the shielding effect for the electric field is not necessarily sufficient, and the problem caused by generation of the smear phenomenon still exists. Although the smear phenomenon could be suppressed by increasing the shielding effect with broadening of the width of the common electrode, the broadening of the width of the common electrode causes another problem in which the aperture ratio of the liquid crystal display apparatus is decreased.

SUMMARY OF THE INVENTION

One of the objects of the present invention is to solve the above problems, and to provide an active matrix type liquid crystal display apparatus of the in-plane switching mode type, which is capable of providing a wide viewing angle and a high image quality without generating the smear phenomenon.

The gist of the present invention to achieve the above object is as follows.

An active matrix type liquid crystal display apparatus, comprises a plurality of electrodes, which are formed on a substrate so that an electric field in parallel to the substrate can be supplied to a liquid crystal layer, and a polarizer is provided, which changes its optical characteristics based on an alignment condition of the liquid crystal layer, wherein a shielding layer formed on the substrate in parallel to the image signal electrodes has a specific resistivity of less than $10^8$ Ω.cm.

The shielding layer formed on the substrate in parallel to the image signal electrodes is desirably further coated with an insulator of at least $10^8$ Ω.cm.

The specific resistivity of the shielding layer formed in parallel to the scanning electrode is also desirably at least $10^8$ Ω.cm.

A counterpart to an image signal electrode of the shielding layer formed in parallel to the image signal electrodes is preferably an electric conductor, and the potential of the shielding layer formed in parallel to the image signal electrodes is preferably set at the same level as the potential of the common electrode.

This means that a member for absorbing an electric field is used as the shielding layer concurrently, so that the electric field generated from the image signal electrode is shielded so as to exert no influence on the electric field supplied to the liquid crystal layer. Further, the member for absorbing the electric field may be arranged at only a counterpart to the image signal electrode, and a high shielding effect is generated by arranging the shielding layer made of a high insulating material, such as a metal, so as to cover the member.

The member for absorbing the electric field can be made of an electric conductor, such as a metal. In this case, the shielding effect for the electric field can be increased by arranging the member for absorbing the electric field at only the counterpart to the image signal electrode, providing the member so as to have the same potential as the potential of the common electrodes, and arranging the shielding layer having a high specific resistivity so that it covers the member.

As the insulating and shielding layer, an organic polymer material mixed with conductive particles, such as metallic particles and/or carbon particles, is used, and its specific conductivity can be controlled by adjusting the mixing amount of the conductive particles.

A theory of operation of the in-plane switching mode will be explained hereinafter.

FIG. 1 indicates a schematic structure of an active matrix type liquid crystal display apparatus of the in-plane switching mode type, relating to the present invention. A feature is that the composition of the black matrix 22a, which is parallel to the image signal electrodes, differs from the composition of the black matrix 22b which is parallel to the scanning electrodes.

FIGS. 2(a) and 2(b) are schematic vertical cross sections indicating the operation of the liquid crystal in the liquid crystal panel of the present invention, and FIGS. 2(c) and 2(d) are their schematic elevations. A vertical cross section of the cell when no voltage is supplied is indicated in FIG. 2(a), and its elevation is indicated in FIG. 2(c). Active elements are omitted in these figures. In accordance with the present invention, plural pixels are formed by forming plural stripe shaped electrodes, but only a part of the pixels are shown in FIGS. 2(a) and 2(b).

FIG. 3 indicates a relationship between an angle $\phi_p$ formed by the polarized transmission axis 11 of the polarizer 8 to the direction of the electric field 9, and an angle $\phi_{LP}$ formed by the longitudinal axis (an optical axis) of the liquid crystal molecule (the rubbing direction 10) at the vicinity of the substrate boundary to the direction of the electric field 9. The polarizer and the substrate form a pair at the upper region and lower region, respectively. Therefore, if necessary, the symbols $\phi_{P1}$, $\phi_{P2}$, $\phi_{LC1}$, $\phi_{LC2}$ are used.

As shown in FIG. 2(a), stripe shaped electrodes 1, 3, 4 are formed inside of a pair of transparent substrates 7, 7', whereon alignment layers 5, 5', are formed, and a liquid crystal layer is interposed between them.

A rod shaped liquid crystal molecule 6 is aligned so as to form an angle to the longitudinal direction of the stripe shaped electrodes 1, 4, that is, 45 degrees $<|\phi_{LC}|\leq 90$ degrees, when no voltage is supplied. In the following explanation, a case when the alignment directions 10 of the liquid crystal molecules 6 at the upper boundary and the lower boundary are in parallel, that is when $\phi_{LC1}=\phi_{LC2}$, is taken as an example. The dielectric anisotropy of the liquid crystal composition is assumed to be positive, but, even if it is negative, no problem results.

By supplying an electric field 9, the liquid crystal molecules change their alignment direction along the direction of the electric field, as shown in FIGS. 2(b) and 2(d). Therefore, the optical transmissivity can be altered by supplying an electric field while arranging the polarizers 8, 8' at a designated angle (direction of the polarized transmission axis 11).

When the dielectric anisotropy of the liquid crystal composition is negative, the initial alignment direction is oriented to an angle $|\phi_{LC}|$, which is perpendicular to the longitudinal direction of the stripe shaped electrode, (that is, 0 degree $<|\phi_{LC}|\leq 45$ degrees).

A means for shielding unnecessary electric fields relating to the present invention will be explained hereinafter.

Smear, a cross talk phenomenon, can be decreased by restricting the specific resistivity of the black matrix 22a, which is in parallel to the image signal electrodes, to less than $10^8$ Ω.cm.

In accordance with the in-plane switching mode, the electrodes are formed fundamentally only on the substrate whereon the active elements are mounted. And, because the electric field is supplied in a direction parallel to the substrate, any conductor on the opposing substrate becomes a disturbance to the electric field.

Therefore, when a black matrix is provided on the opposing substrate, an insulator, not a metal, which does not influence the supplied electric field, has been used as the material for the black matrix.

The inventor found that the shielding effect, which ensured that the unnecessary electric field between the image signal electrodes 3 and the pixel electrodes, and between the pixel electrodes and the common electrodes 1, would not influence the electric field parallel to the substrate between the pixel electrodes and the common electrodes 1, could be obtained by restricting the specific resistivity of the black matrix formed in parallel to the image signal electrode 3 to less than $10^8$ Ω.cm. The above finding is based on a relationship that an insulator having a specific resistivity less than $10^8$ Ω.cm absorbs an electric field even though it is an insulator.

The relationship is shown in FIG. 4(a). The relationship indicates a driving voltage at a spot (b), where the influence of the black matrix could be expected, when the black matrix is formed on the substrate (II) counter to the substrate (I) having comb-shaped electrodes thereon, as shown in FIG. 4(b).

As a result, it was revealed that the driving voltage increased in a range wherein the specific resistivity of the black matrix material was less than $10^8$ Ω.cm. This means that an insulator having a specific resistivity less than $10^8$ Ω.cm could absorb an electric field. Accordingly, a shielding effect with respect to the electric field, which is generated by the image signal electrodes and is unnecessary for driving the liquid crystal layer, can be obtained by using an insulator having a specific resistivity less than $10^8$ Ω.cm as the material for the black matrix. And, an improvement in preventing the generation of cross talk, appearing as a smear generated in parallel to the image signal electrodes, can be achieved.

However, there are several practical methods-in setting the specific resistivity to less than $10^8$ Ω.cm for the black matrix formed counter to the image signal electrodes in order to shield unnecessary electric fields of the image signal for preventing generation of cross talk One of the methods is that the entire black matrix formed counter to the image signal electrodes is fabricated with a material having a specific resistivity which is less than $10^8$ Ω.cm. However, in this case, the possibility exists that a displacement in alignment of the upper and lower substrates may occur, causing the black matrix to intrude into a liquid crystal driving region. In such a case, a problem may occur in that an adequate electric field can not be supplied to the liquid crystal layer. The problem relating to the alignment can be solved by making only a part of the black matrix formed counter to the image signal electrodes, especially only the part aligned with the image signal electrodes, have a specific resistivity less than $10^8$ Ω.cm, and providing the rest of the part with material having a specific resistivity at least $10^8$ Ω.cm. The above double structure can be replaced with a structure wherein the entire structure made of a material having a specific resistivity less than $10^8$ Ω.cm is covered with a material having a specific resistivity of at least $10^8$ Ω.cm, as shown in FIG. 7. Further, a structure wherein the material having a specific resistivity less than $10^8$ Ω.cm may be interposed between the material having a specific resistivity of at least $10^8$ Ω.cm, as shown in FIG. 8. Furthermore, a structure wherein a concave shaped material having a specific resistivity less than $10^8$ Ω.cm may be fit in a convex shaped material having a specific resistivity at least $10^8$ Ω.cm.

The shielding effect with respect to the electric field of the black matrix formed in parallel to the image signal electrodes can be increased further by using an electrically conductive material as the material having a specific resistivity less than $10^8$ Ω.cm.

In the above case, the absorbing effect with respect to the electric field can be more properly stabilized when the conductor has a constant potential, than in a case when the conductor has a drifting potential. Accordingly, the shielding effect with respect to the electric field can be increased further by setting the potential of the conductor always at the same level as the potential of the common electrode 1.

The specific resistivity of the above materials, wherein metallic particles or carbon are dispersed in an organic high polymer material, can be adjusted by controlling the amount of metallic particles or carbon in the material.

BRIEF DESCRIPTION OF THE DRAWINGS

These and other objects, features and advantages of the present invention will be understood more clearly from the following detailed description with reference to the accompanying drawings, wherein:

FIG. 5 is a plan view of a typical example of an electrode structure in a unit pixel of a liquid crystal display apparatus relating to the present invention, FIG. 5(A) is a section view taken along line A–A' and FIG. 5(B) is a section taken along line B–B' in FIG. 5;

FIG. 7 is a schematic view representing another example of a structure of a color filter substrate, FIG. 7(A) is a section view taken along line A–A' and FIG. 7(B) is a section view taken along line B–B' in FIG. 7, and FIG. 7(C) is an enlargement of the area C in FIG. 7;

FIG. 8 is a schematic view representing another example of a structure of a color filter substrate, FIG. 8(A) is a section view taken along line A–A' and FIG. 8(B) is a section view taken along line B–B' in FIG. 8, and FIG. 8(C) is an enlargement of the area C in FIG. 8;

DESCRIPTION OF THE PREFERRED EMBODIMENTS

Hereinafter, various embodiments of the present invention will be explained with reference to the drawings.

Embodiment 1

Figure 1:
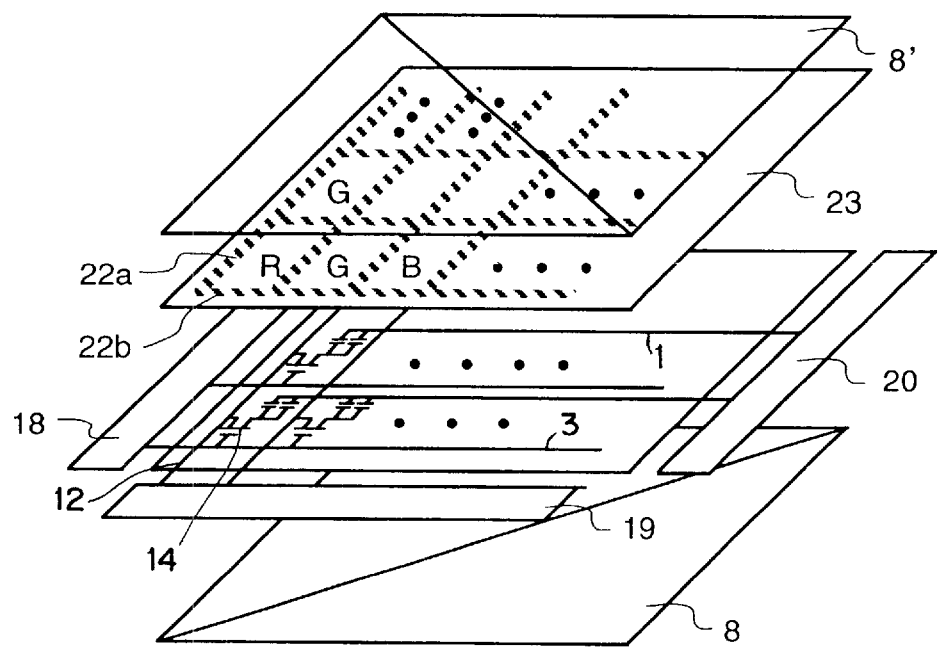
FIG. 1 is a schematic perspective view of an active matrix type liquid crystal display apparatus relating to the present invention.
Figure 3:
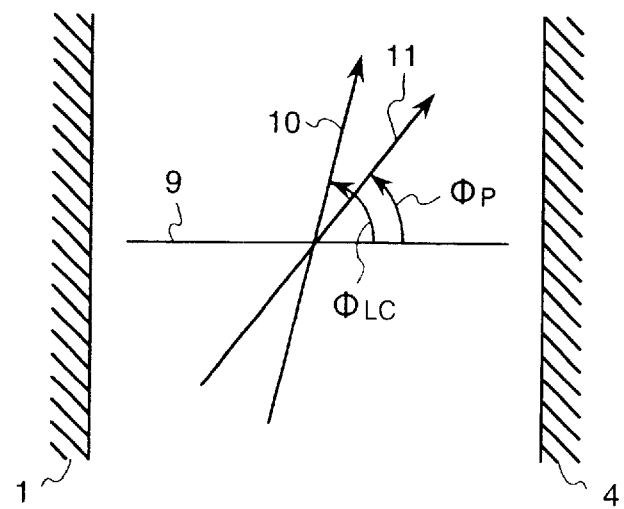
FIG. 3 is an illustration indicating definitions of a rubbing direction and an axial direction of a polarizer.

FIG. 1 is a schematic diagram of an active matrix type liquid crystal display apparatus relating to the present invention, and FIG. 5 illustrates the structures of the thin film transistor (referred to hereinafter as a TFT) and respective electrodes in a unit pixel of the above panel display.

Figure 2A:
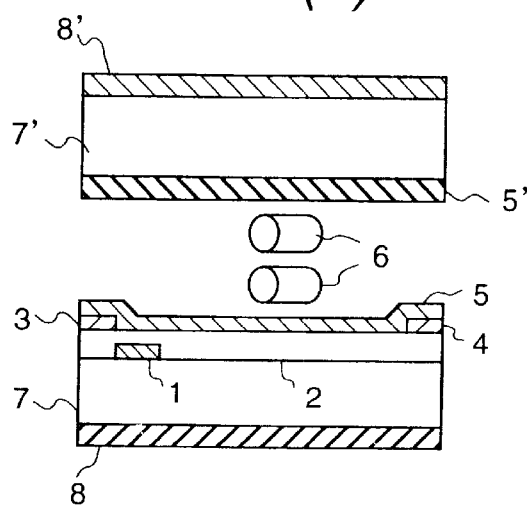
FIGS. 2(a), 2(b), 2(c), and 2(d) are schematic illustrations indicating an operation of liquid crystals in an in-plane switching mode relating to the present invention.

In accordance with the present invention, as also seen in FIG. 2(a), the active matrix type liquid crystal display apparatus comprises a pair of substrates 7, 7', a liquid crystal layer formed by liquid crystal molecules 6 interposed between the substrates, plural scanning electrodes 12, plural image signal electrodes 3 which cross the plural scanning electrodes 12 to form a matrix shape, pixel electrodes 4 formed closely and in parallel to the image signal electrodes 3, and plural TFT 14, which are active elements, formed at points where the scanning electrodes 12 cross the image signal electrodes and the pixel electrodes 4, all of the above electrodes and the TFT being formed on the one substrate 7 of the pair of substrates. An insulating layer, i.e. a silicon nitride layer, is formed on the above members, and additionally an alignment layer 5 is applied onto the insulating layer. The alignment layer 5, which is composed of an organic composition, is provided at a boundary between the substrate 7 and the liquid crystal layer, and rubbing treatment is performed on the surface of the alignment layer.

Figure 2B:
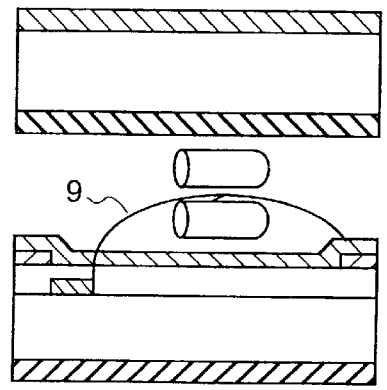
Figure 2C:
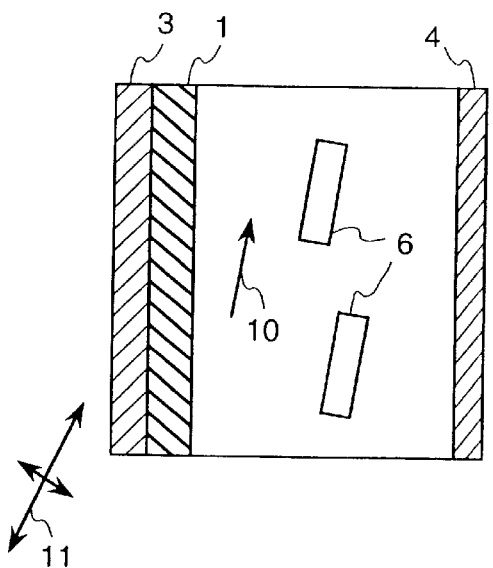
Figure 2D:
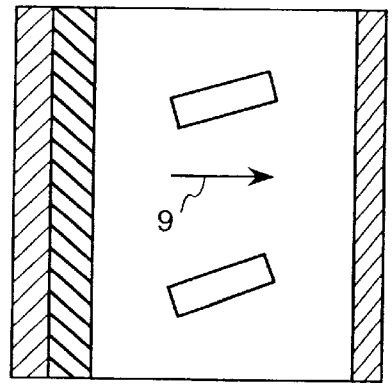
Figure 4A:
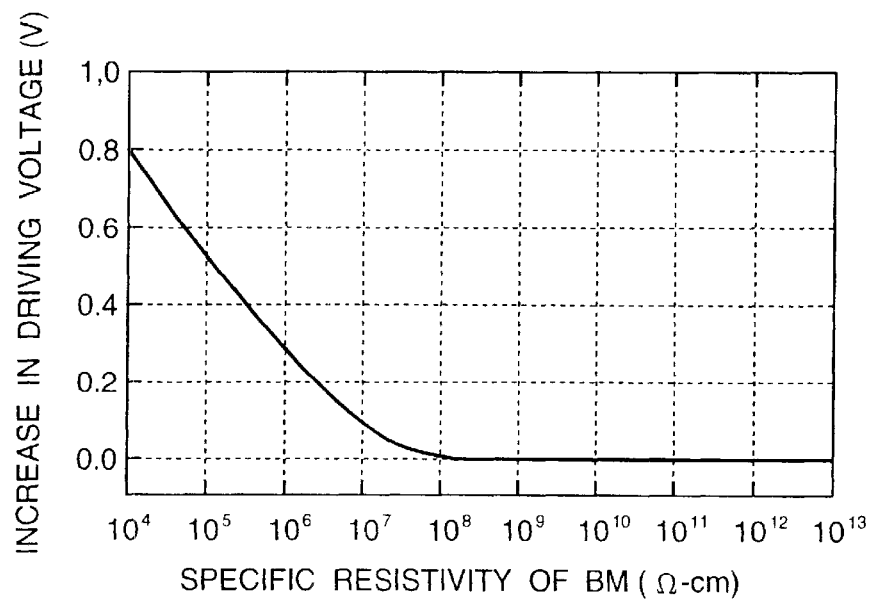
FIG. 4(a) is a graph indicating the influence of specific resistivity of a black matrix to an electric field supplied to liquid crystals.
Figures 4B, 4C:
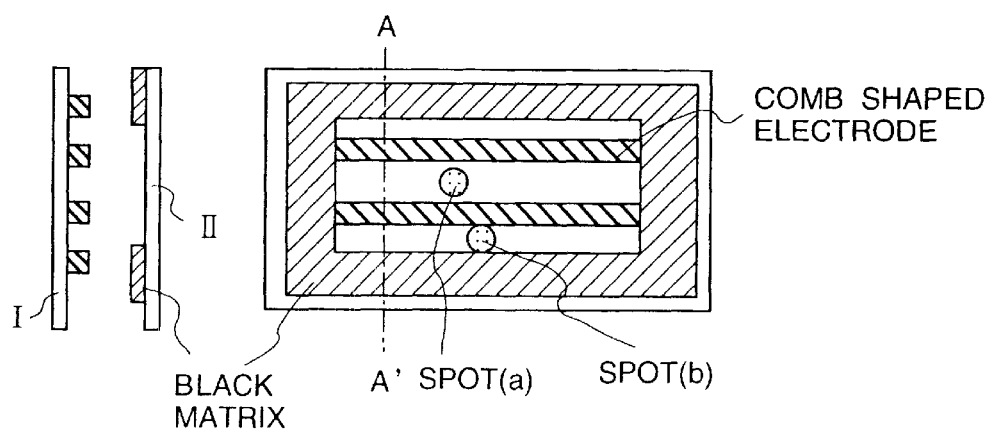
FIG. 4(b) is a schematic illustration of the substrate used in an experiment for obtaining the result shown in FIG. 4(a)
FIG. 4(c) is a cross section taken along line A–A' in FIG. 4(b)

Common electrodes 1 are formed between the pixel electrodes 4 and adjacent image signal electrodes 3 so as to generate an electric field 9 in parallel to the substrate between the pixel electrodes 4 and the common electrodes 1 formed in the active elements, as shown in FIG. 2(b).

In accordance with the present embodiment, color filters 23 with a black matrix were formed on the other one of the substrates, as shown in FIG. 1, polyimide was applied onto the surface of the color filters and rubbing treatment was performed thereon.

A plan view from a direction perpendicular to the substrate is shown in FIG. 5 and schematic cross sectional views taken on the lines A—A, and B–B' in the plan view of a typical example of the electrode structure are shown in FIG. 5(A) and FIG. 5(B), respectively.

The TFT 14 is composed of pixel electrodes (source electrodes) 4, image signal electrodes (drain electrodes) 3, scanning electrodes (gate electrodes) 12, and amorphous silicon 13. The common electrodes 1, the scanning electrodes 12, the image signal electrodes 3, and the pixel electrodes 4 were formed from the same metallic layer by making a pattern.

Capacitance elements 16 were formed by a structure, wherein the insulating layer 2 was interposed between the pixel electrode 4 and the common electrode 1 in a region between the two common electrodes 1, and another insulating layer 25 was also interposed between the alignment layer 5 and the pixel electrode 4, as shown in the A–A' cross sectional view in FIG. 5(A).

The pixel electrodes 4 are arranged among three common electrodes 1, as shown in the plan view of FIG. 5. The pixel pitch is laterally, i.e. between the image signal electrodes 3, 100 μm, and longitudinally, i.e. between the scanning electrodes 12, 300 μm. The width of the scanning electrode 12 which extends across plural pixels, and the portions of the image signal electrode 3 and the common electrode 1 extending in parallel to the scanning electrode 12 (the horizontal direction in FIG. 5), were formed to be wide in order to avoid any defect in wiring. The above widths are, respectively, 10 μm, 8 μm, and 8 μm.

On the contrary, the portions of the pixel electrode 4 and the common electrode 1 extending in parallel to the longitudinal direction of the image signal electrode 3, which portion were formed independently by a respective unit pixel, were formed to be somewhat narrow, such as 5 μm and 6 μm, respectively. The narrow width of the electrode provides an increased possibility of a short or breakage of the circuit by contamination with dust or the like, but the defect is restricted to only a unit pixel, so that the defect is not likely to be extended to a line defect.

An interval of 2 μm was provided between the image signal electrode 3 and the common electrode 1 using an insulating layer.

Figures 6, 6A, 6B:
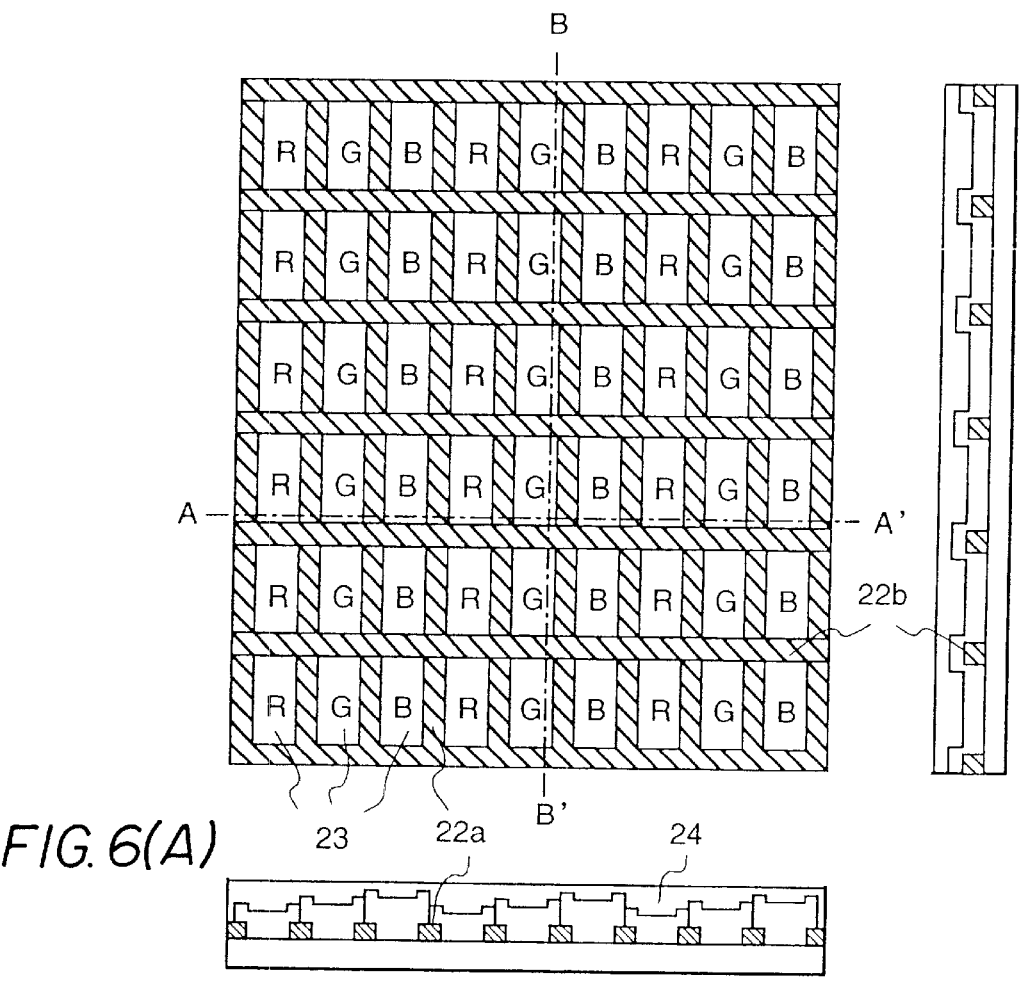
FIG. 6 is a schematic view representing an example of a structure of a color filter substrate.
FIG. 6(A) is a section view taken along line A–A' and FIG. 6(B) is a section view taken along line B–B' in FIG. 6.

A schematic illustration of an example of the color filter substrate composition with a black matrix is shown in FIG. 6. FIG. 6 is a plan view as seen from a direction perpendicular to the substrate and schematic cross sectional views taken on lines A–A' and B–B' in the plan view are shown in FIG. 5 and FIGS. 6(A) and 6(B), respectively.

A material prepared by mixing carbon and organic pigments was used as the material for the black matrix. The black matrix arranged in parallel to the scanning electrode 12 was formed by the steps of applying the black matrix material (a) onto the substrate, exposing a pattern, and developing the pattern. Subsequently, the black matrix arranged in parallel to the image signal electrode 3 was formed by the steps of applying the black matrix material (b) onto the substrate, exposing a pattern, and developing the pattern. Width of the black matrix was 16 μm, and it was formed so not to enter into the pixel region from a center line through the width of the common electrode 1. The arrangement of the black matrix on the electrodes substrate is indicated as a window expressed by dashed lines in FIG. 5. The specific resistivities of the black matrix materials (a) and (b) were adjusted by controlling the mixed amounts of carbon. In the present embodiment, the specific resistivity of the material (a) was $2 \times 10^9$ Ω.cm, and that of the material (b) was $8 \times 10^7$ Ω.cm (both values were the specific resistivities after forming the black matrix, hereinafter the same specific resistivity was used).

Subsequently, an active matrix type liquid crystal display apparatus relating to the present invention was obtained by forming the color filter 23 at respective regions R, G, and B by the steps of coating with photosensitive resins mixed with pigments, exposing a pattern, and developing.

Embodiment 2

The present embodiment is the same as the embodiment 1 except for the following items.

The specific resistivity of the material (a) for the black matrix, which was arranged in parallel to the scanning electrode 12, was changed to $1 \times 10^8$ Ω.cm. And, the specific resistivity of the material (b) for the black matrix, which was arranged in parallel to the image signal electrode 3, was changed to $5 \times 10^7$ Ω.cm.

Embodiment 3

The present embodiment is the same as the embodiment 1 except for the following items.

A schematic illustration of another example of the color filter substrate composition with a black matrix is shown in FIG. 7. The black matrix, which was arranged in parallel to the image signal electrode 3, was formed with the material (b). The width of the black matrix was somewhat narrower than that of the image signal electrode 3, i.e. 6 μm. Then, the black matrix, which was arranged in parallel to the scanning electrode 12, and a coating surrounding both sides of the black matrix formed with the material (b), were formed with the material (a).

The final width of the black matrix in parallel to the image signal electrode 3 was 16 μm. The arrangement of the black matrix in the electrode substrate is indicated as a window expressed by the dashed lines in FIG. 5.

In the present embodiment, the specific resistivity of the material (a) for the black matrix was $3 \times 10^{10}$ Ω.cm, and of the material (b) for the black matrix was $3 \times 10^6$ Ω.cm.

Embodiment 4

The present embodiment is the same as the embodiment 1 except for the following items.

A schematic illustration of another example of the color filter substrate composition with a black matrix is shown in FIG. 8. The black matrix, which was arranged in parallel to the image signal electrode 3, was formed with the material (b). The width of the black matrix was somewhat narrower than that of the image signal electrode 3, i.e. 6 μm. Then, the black matrix, which was arranged in parallel to the scanning electrode 12, and a coating surrounding both sides of the black matrix formed with the material (b), were formed with the material (a).

The final width of the black matrix in parallel to the image signal electrode 3 was 16 μm. The arrangement of the black matrix in the electrode substrate is indicated as a window expressed by the dashed lines in FIG. 5.

In the present embodiment, the specific resistivity of the material (a) for the black matrix was $5 \times 10^9$ Ω.cm, and of the material (b) for the black matrix was $5 \times 10^6$ Ω.cm.

Embodiment 5

The present embodiment is the same as the embodiment 3 except for the following items.

The black matrix, which was arranged in parallel to the image signal electrode 3, was formed using chromium as the material (b). The width of the black matrix was somewhat narrower than the image signal electrode 3, i.e. 6 μm.

Further, the black matrix made of chromium was coated with the material (a). The final width of the black matrix in parallel to the image signal electrode 3 was 16 μm. Simultaneously, the black matrix in parallel to the scanning electrode 12 was formed. The arrangement of the black matrix in the electrode substrate is indicated as a window expressed by the dashed lines in FIG. 5.

In the present embodiment, the specific resistivity of the material (a) for the black matrix was $1 \times 10^{10}$ Ω.cm.

Embodiment 6

In the present embodiment, the active matrix type liquid crystal display apparatus obtained in the embodiment 5 was used.

Figure 9:
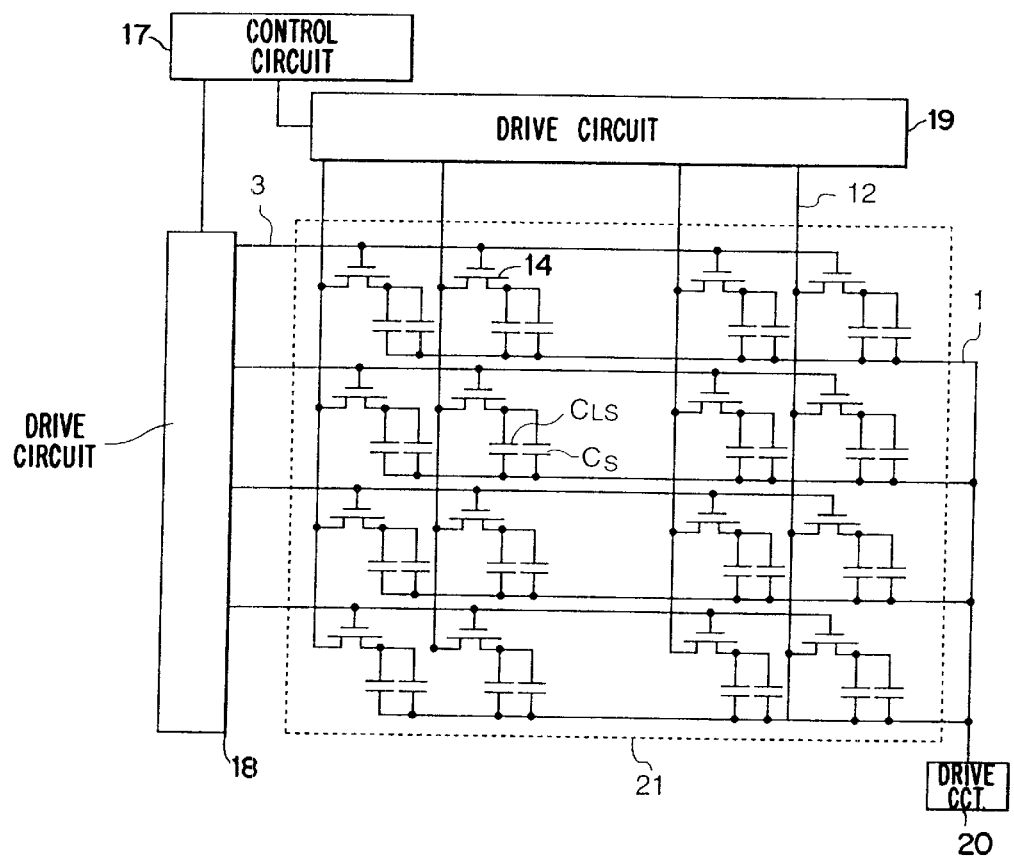
FIG. 9 is a schematic circuit diagram of a liquid crystal display apparatus relating to the present invention.

In order to supply an alternating current to the common electrode 1, the following arrangement was adopted. An image signal electrode driving circuit 18 was connected to the respective image signal electrodes 3, and a scanning electrode driving circuit 19 was connected to the respective scanning electrodes 12, as indicated in FIG. 9. A common electrode driving circuit 20 was connected to the common electrode 1. All of the above driving circuits were controlled by a control circuit 17.

Figure 10:
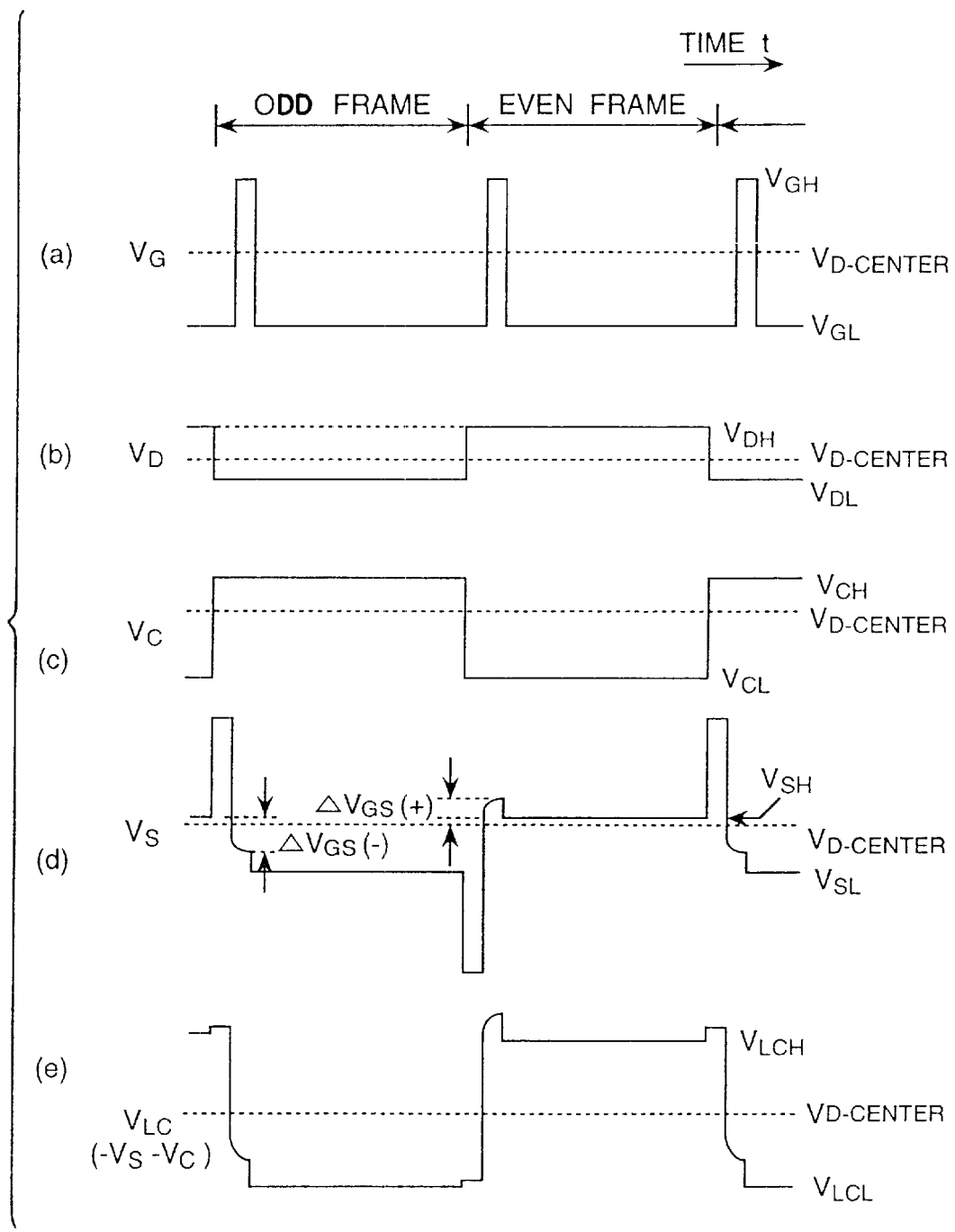
FIG. 10 is a wave form diagram indicating an example of wave forms when a common electrode is made to operate as an alternating current electrode.

A signal having information is supplied to the image signal electrode 3, and a scanning signal is supplied to the scanning electrode 12 synchronously with the information signal. The information signal is transmitted from the image signal electrode 3 to the pixel electrode 4 via the TFT 14, and a voltage is supplied to the liquid crystal layer between the liquid crystal layer and the common electrode 1. In accordance with the present embodiment, a voltage wave form is also supplied to the common electrode 1, and a higher voltage by as much as the voltage supplied to the common electrode 1 is supplied to the liquid crystal layer. The supplied wave forms to respective wiring electrodes are indicated in FIG. 10.

The amplitudes of the voltage wave forms were set as follows:

$V_{D\text{-}CENTER}=14.0$
$V_{GH}=28.0$
$V_{GL}=0$
$V_{DH}=16.4$
$V_{DL}=11.4$
$V_{CH}=15.1$
$V_{CL}=9.1$ In this case, the metallic portion of the black matrix in parallel to the image signal electrode 3 was connected to the common electrode 1 so as to have always the same potential as the common electrode 1.

The active matrix type liquid crystal display apparatus, wherein the voltage to the common electrode 1 was supplied by an alternating current, had a wide viewing angle, which did not cause any reversion of the gradation in a range of 60 degrees in all four directions, i.e. right, left, up, and down, and no smear, resulting from cross talk generated along the image signal electrode 3, was observed.

In accordance with the present invention, an active matrix type liquid crystal display apparatus of the in-plane switching mode type, having a wide viewing angle and no cross talk generation can be obtained by making the shielding layer (black matrix), which is formed in parallel to the image signal electrodes in the in-plane switching mode, have the specific resistivity of, at the utmost, $10^8$ $\Omega$.cm.

Furthermore, an active matrix type liquid crystal display apparatus of the in-plane switching mode type, generating no cross talk, can be obtained by coating the black matrix with an insulating layer having the specific resistivity of at least $10^8$ $\Omega$.cm.

What is claimed is:

1. An active matrix type liquid crystal display apparatus, comprising:

a pair of opposed substrates; and a liquid crystal layer interposed between said pair of substrates;

one of said pair of substrates comprising
(a) plural scanning electrodes,
(b) plural image signal electrodes crossing said plural scanning electrodes,
(c) plural active elements formed at respective crossing points of said plural scanning electrodes and said plural image signal electrodes,
(d) plural pixel electrodes formed on said plural active elements, and
(e) plural common electrodes for generating an electric field between said pixel electrodes and common electrodes;

wherein a shielding layer is provided between another of said pair of substrates and said plural image signal electrodes at least at a part of an upper region on said plural image signal electrodes, and a specific resistivity of at least a part of said shielding layer is less than $10^8$ $\Omega$.cm;

wherein at least said part of said shielding layer is composed of a material having a specific resistivity of less than $10^8$ $\Omega$.cm; and wherein at least said part of said shielding layer composed of said material having a specific resistivity of less than $10^8$ $\Omega$.cm has a width narrower than a width of said image signal electrodes.

* * * * *